(12) United States Patent  
Bartl et al.

(10) Patent No.: US 12,449,293 B2  
(45) Date of Patent: Oct. 21, 2025

(54) DOSING BOTTLE ARRANGEMENT AND METHODS

(71) Applicant: Spectrum Brands, Inc., Middleton, WI (US)

(72) Inventors: Elena Bartl, Osnabrueck (DE); Luise Pfende, Melle (DE)

(73) Assignee: Spectrum Brands, Inc., Middleton, WI (US)

( * ) Notice: Subject to any disclaimer, the term of this patent is extended or adjusted under 35 U.S.C. 154(b) by 287 days.

(21) Appl. No.: 18/028,619

(22) PCT Filed: Sep. 29, 2021

(86) PCT No.: PCT/US2021/052698  
§ 371 (c)(1),  
(2) Date: Mar. 27, 2023

(87) PCT Pub. No.: WO2022/072531  
PCT Pub. Date: Apr. 7, 2022

(65) Prior Publication Data  
US 2023/0358589 A1    Nov. 9, 2023

Related U.S. Application Data

(60) Provisional application No. 63/085,579, filed on Sep. 30, 2020.

(51) Int. Cl.  
*G01F 11/28*    (2006.01)  
*B65D 41/02*    (2006.01)  
(Continued)

(52) U.S. Cl.  
CPC ............ *G01F 11/286* (2013.01); *B65D 41/02* (2013.01); *B65D 43/0225* (2013.01);  
(Continued)

(58) Field of Classification Search  
CPC ... G01F 11/286; B65D 41/02; B65D 43/0225; B65D 47/20; B65D 51/18; B65D 51/245;  
(Continued)

(56) References Cited

U.S. PATENT DOCUMENTS 3,581,953 A * 6/1971 Donoghue ............. B65D 35/40  
                                          222/207  
3,628,700 A * 12/1971 Dodoghue .......... B05B 11/0059  
                                          222/211  
(Continued)

FOREIGN PATENT DOCUMENTS

DE          3800667 C2    7/1990  
EP           0335505 B1    7/1992  
(Continued)

OTHER PUBLICATIONS

International Search Report and Written Opinion for PCT/US2021/052698 (Jan. 19, 2021).

*Primary Examiner* — Paul R Durand  
*Assistant Examiner* — Michael J. Melaragno  
(74) *Attorney, Agent, or Firm* — Merchant & Gould P.C.

(57) ABSTRACT

A dosing bottle has a container; a riser; a cap piece; a standpipe connected to the riser and one or more return openings in a tubular wall of the standpipe; and a closure member. The closure member is rotatably attached to the cap piece and defines an interior dosing volume and a dispenser opening. The closure member is axially movable relative to the cap piece between a closed position and an open position. The open position allows a liquid in the interior volume of the container to flow through the riser and through the return opening and into the interior dosing volume.

16 Claims, 3 Drawing Sheets

(51) Int. Cl.
  *B65D 43/02* (2006.01)
  *B65D 47/20* (2006.01)
  *B65D 51/18* (2006.01)
  *B65D 51/24* (2006.01)
(52) U.S. Cl.
  CPC ............ *B65D 47/20* (2013.01); *B65D 51/18* (2013.01); *B65D 51/245* (2013.01); *B65D 2203/04* (2013.01); *B65D 2251/0003* (2013.01); *B65D 2543/00055* (2013.01); *B65D 2543/00092* (2013.01); *B65D 2543/00351* (2013.01)
(58) Field of Classification Search
  CPC ........ B65D 2203/04; B65D 2251/0003; B65D 2543/00055; B65D 2543/00092; B65D 2543/00351
  See application file for complete search history.

(56) References Cited

U.S. PATENT DOCUMENTS

| | | | |
|---|---|---|---|
| 4,074,831 A | 2/1978 | Roach | |
| 4,143,794 A | 3/1979 | Stratford et al. | |
| 4,971,226 A * | 11/1990 | Donoghue | B29C 45/33 222/207 |
| 5,020,699 A | 6/1991 | Sams | |
| 5,148,953 A | 9/1992 | Fudalla | |
| 5,251,792 A | 10/1993 | Sheen | |
| 5,253,788 A | 10/1993 | Vandromme et al. | |
| 5,261,569 A * | 11/1993 | Sandwell | G01F 11/286 222/158 |
| 5,330,081 A * | 7/1994 | Davenport | G01F 11/286 222/207 |
| 5,381,930 A * | 1/1995 | Kalabakas | G01F 11/286 222/205 |
| 5,833,124 A | 11/1998 | Groves et al. | |
| 5,988,434 A | 11/1999 | Keil et al. | |
| 6,068,165 A | 5/2000 | Minihane et al. | |
| 6,357,630 B1 | 3/2002 | Sperna Weiland | |
| 6,675,845 B2 | 1/2004 | Volpenheim et al. | |
| 6,923,344 B1 | 8/2005 | Chien | |
| 7,497,359 B2 | 3/2009 | Bergin et al. | |
| 8,057,733 B2 * | 11/2011 | Begley | B29C 49/06 425/522 |
| 9,068,874 B2 | 6/2015 | Debski | |
| 9,625,299 B2 | 4/2017 | Holden et al. | |
| 10,365,141 B2 | 7/2019 | Freiburger et al. | |
| 10,488,241 B2 | 11/2019 | Hoefte | |
| 2009/0159482 A1 * | 6/2009 | Begley | G01F 11/262 264/535 |
| 2017/0015474 A1 | 1/2017 | Szekely et al. | |
| 2019/0118204 A1 | 4/2019 | Skillin et al. | |
| 2023/0358589 A1* | 11/2023 | Bartl | B65D 47/20 |

FOREIGN PATENT DOCUMENTS

| | | | |
|---|---|---|---|
| EP | 3315923 A1 | 5/2018 | |
| JP | H09-104456 A | 4/1997 | |
| JP | 2002-068250 A | 3/2002 | |
| JP | 2003040309 A * | 2/2003 | |
| WO | 96/21846 A1 | 7/1996 | |
| WO | WO-2022072531 A1 * | 4/2022 | ............ B65D 41/02 |

\* cited by examiner

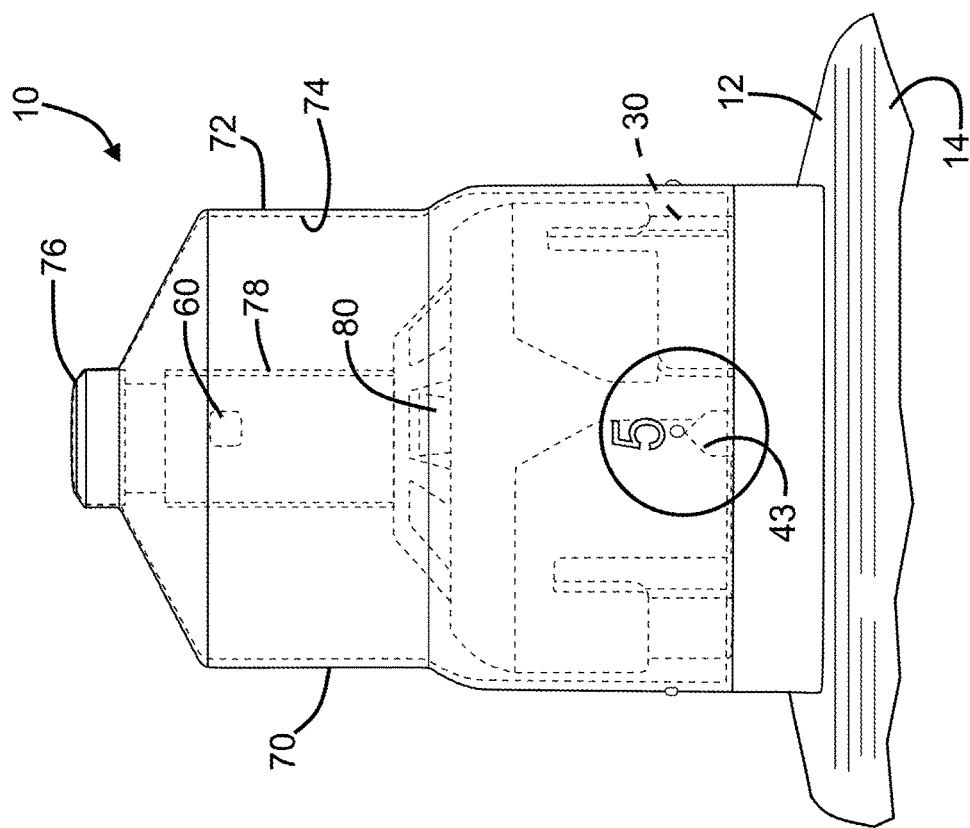
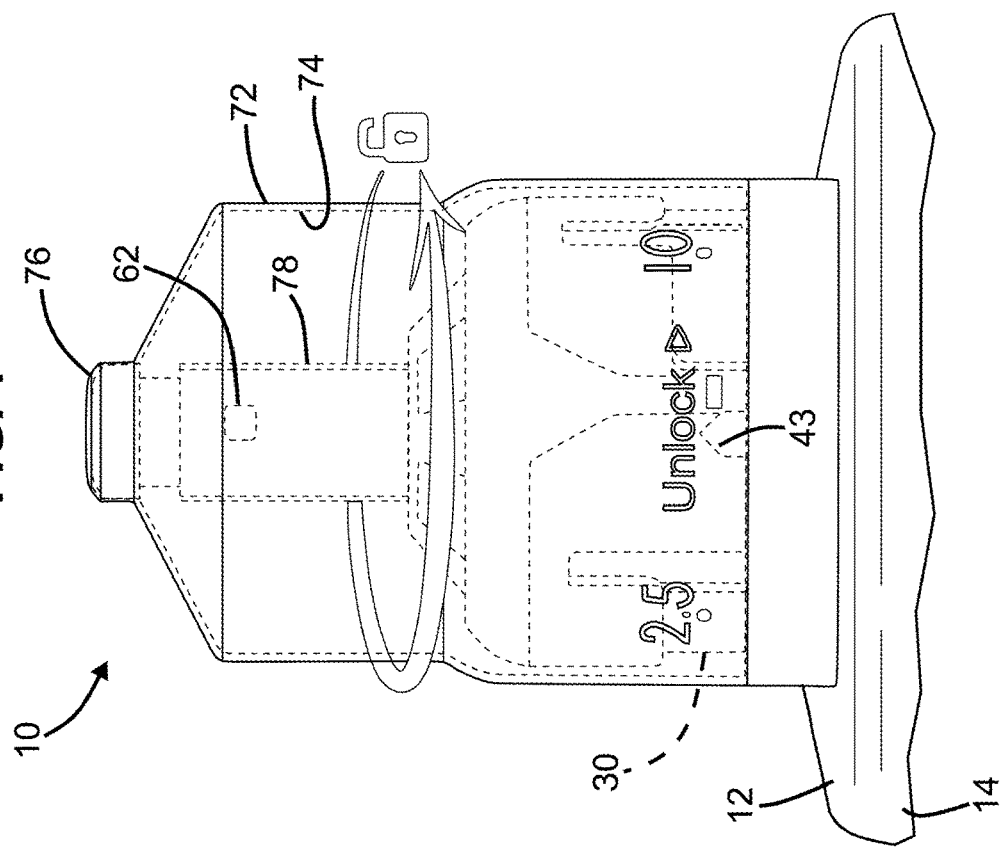

DOSING BOTTLE ARRANGEMENT AND METHODS

CROSS-REFERENCE TO RELATED APPLICATION

This application is a National Stage Application for PCT/US2021/052698, filed Sep. 29, 2021, which claims the benefit of priority to U.S. Provisional Patent Application No. 63/085,579, filed Sep. 30, 2020; which applications are incorporated herein by reference. To the extent appropriate, a claim of priority is made to each of the above disclosed applications.

TECHNICAL FIELD

This disclosure relates to a dosing bottle arrangement. In particular, this disclosure relates to a dosing device having a rotary end axially moving closure.

BACKGROUND

In general, certain types of bottles may include a dosing device on the closure itself, which is carried out by pouring the liquid from the bottle into a dosing cap and then dosing using a measuring scale marked on the inside of the dosing cap. Disadvantages of these types of systems include measurement inaccuracy; the contamination of the measuring chamber by product residue; and an associated difficulty with reading the measuring scale when reused. In addition, there can be increased expense to the end user if product is wasted.

Improvements in dosing systems are desirable.

SUMMARY

In general, a dosing bottle arrangement is providing improving the prior art. The dosing bottle arrangement comprises a container having a container wall surrounding an interior volume and a protruding neck; the neck having an open mouth in communication with the interior volume; a riser extending from the interior volume of the container and through the open mouth of the neck; a cap piece having: an outer surrounding wall removably attached to the neck; a gusset arrangement radially extending from the outer surrounding wall and within the open mouth of the neck; and a standpipe extending from the gusset arrangement; the standpipe including a tubular wall connected to the riser at one end, an opposite closed end, and one or more return openings in the tubular wall; and a closure member having: a surrounding enclosure rotatably attached to the cap piece and defining an interior dosing volume and a dispenser opening; a tube secured to the enclosure within the interior dosing volume; the tube being in covering relation to the standpipe; the tube having an aperture; wherein the closure member is axially movable relative to the cap piece between a closed position and an open position; the closed position including the tube covering all of the return openings in the tubular wall; and the open position including the aperture in the tube being in open communication with one of the return openings, such that a liquid in the interior volume of the container can flow through the riser and through the return opening and into the interior dosing volume.

The one or more return openings includes at least a first opening and a second opening radially and axially spaced from each other; the first opening and second opening each having a predetermined liquid dosing amount associated therewith.

The surrounding enclosure is rotatable relative to the cap piece to select a desired liquid amount for the interior dosing volume; the relative rotational position of the surrounding enclosure and the cap piece placing the tube aperture in radial alignment with one of the first opening or the second opening.

The one or more return openings further includes a third opening and a fourth opening radially and axially spaced from each other and from the first opening and second opening; the third opening and fourth opening each having a predetermined liquid dosing amount associated therewith.

The surrounding enclosure is rotatable relative to the cap piece to select a desired liquid amount for the interior dosing volume; the relative rotational position of the surrounding enclosure and the cap piece placing the tube aperture in radial alignment with one of the first opening, the second opening, the third opening, or the fourth opening. Of course, there can be more or fewer openings.

The outer surrounding wall of the closure member includes visual markings indicative of a predetermined liquid dosing amount associated with each of the return openings.

The closure member is transparent to allow visual inspection of the interior dosing volume.

The container comprises an elastically deformable material, such that the container can be squeezed when the cap piece is in the open position to move liquid in the interior volume of the container through the riser and through the return opening and into the interior dosing volume.

In another aspect, a method of using a dosing bottle arrangement is provided. The method includes selecting a desired liquid dosing amount by rotating a closure member relative to a cap piece and radially align an aperture in a tube of the closure member with a return opening in a tubular wall of a standpipe of the cap piece; axially moving the closure member relative to the cap piece from a closed position to an open position to put the aperture in open communication with the return opening; and squeezing a container having a riser to move liquid in an interior volume of the container through the riser and through the return opening and into an interior dosing volume of the closure member.

The step of squeezing a container having a riser includes squeezing a container wall surrounding the interior volume of the container; the container having a protruding neck; and the neck having an open mouth in communication with the interior volume; the riser extending from the interior volume of the container and through the open mouth of the neck.

The step of selecting a desired liquid dosing amount includes using the cap piece; the cap piece having: an outer surrounding wall removably attached to the neck; a gusset arrangement radially extending from the outer surrounding wall and within the open mouth of the neck; and the standpipe extending from the gusset arrangement; the standpipe including the tubular wall connected to the riser at one end, an opposite closed end, and one or more return openings in the tubular wall.

The step of selecting a desired liquid dosing amount includes rotating the closure member, the closure member having: a surrounding enclosure rotatably attached to the cap piece and defining an interior dosing volume and a dispenser opening; the tube being secured to the enclosure within the interior dosing volume; wherein the closure member is axially movable relative to the cap piece between the closed position and the open position; the closed position including the tube covering all of the return openings in the tubular wall; and the open position including the aperture in the tube being in open communication at least one of the return openings, such that a liquid in the interior volume of the container can flow through the riser and through the return opening and into the interior dosing volume.

The step of rotating the closure member includes moving the surrounding enclosure relative to the cap piece and placing the tube aperture in radial alignment with one of the return openings.

The step of selecting a desired liquid dosing amount includes rotating the closure member relative to the cap piece to align a marking on the closure member with one of the visual markings on the cap piece.

BRIEF DESCRIPTION OF THE DRAWINGS

FIG. 1 is a perspective view of an embodiment of a dosing bottle arrangement in a closed position, constructed in accordance with principles of this disclosure;

FIG. 2 is a perspective view of the dosing bottle arrangement of FIG. 1, in which a closure member has been rotated to select a desired liquid amount for an interior dosing volume;

DETAILED DESCRIPTION

Figure 3:
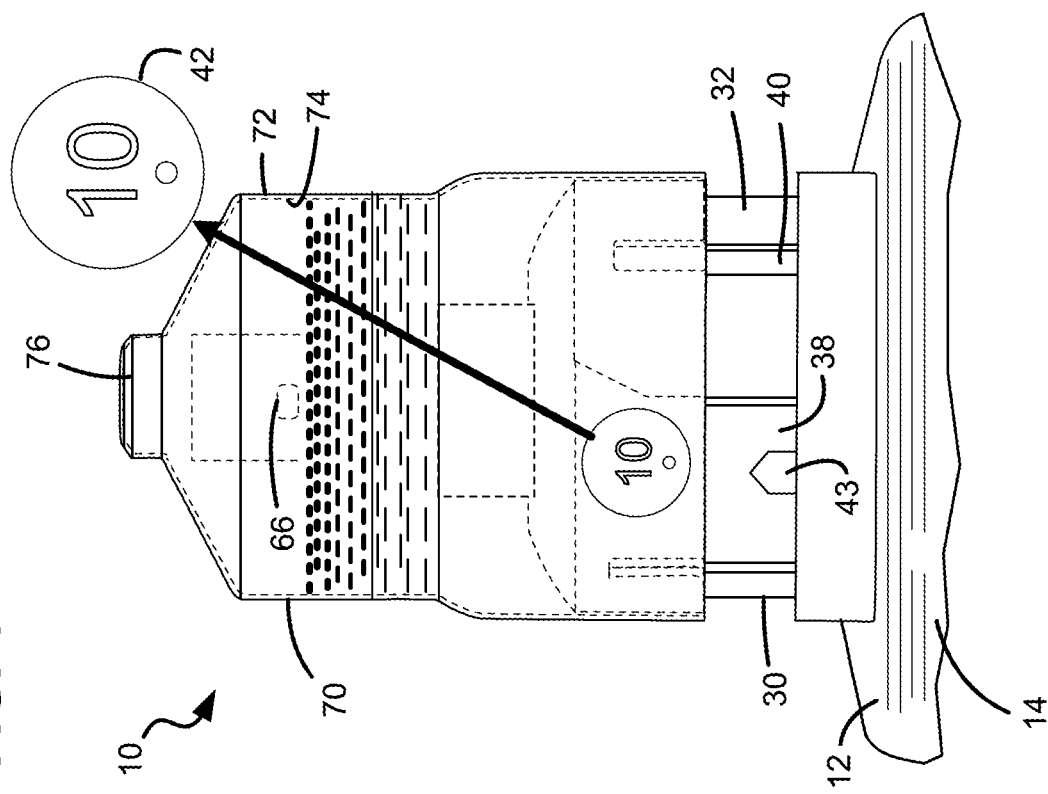
FIG. 3 is the dosing bottle arrangement of FIG. 2, in which the closure member has been moved axially to an open position.

FIGS. 1-4 show a dosing bottle arrangement generally at 10. The dosing bottle arrangement 10 has advantages, in that the user will not have to come in contact with the liquid product in the bottle. In addition, the dosage will be fast and precise. It is easy to handle, as the dosing volume can be preset and a reading of a measuring scale is unnecessary. It also provides for optimal dosage through a number of adjustable volume levels. The number of adjustable volume levels can vary. In the non-limiting example shown in this disclosure, there are at least four adjustable volume levels, but that is an example only. There can be 2, 3, 4, 5, 6, 7, 9, 10 or more adjustable volume levels.

The dosing bottle arrangement 10 include a container wall 14 surrounding an interior volume 16. The interior volume 16 will hold a liquid. The liquid can be any type of liquid in which a proper measured dose is needed while handling. For example, the liquid can be the types of chemicals that are used in aquariums for maintaining cleanliness or to ensure a good healthy aquarium environment.

The container wall 14 is preferably made from an elastically deformable material. An elastically deformable material will allow the container wall 14 to be squeezed by the user with the users hand in order to move liquid from the liquid volume 16 to a remaining portion of the bottle arrangement 10.

The elastic deformation then returns to the original shape, for use again.

The container 12 further includes a protruding neck 18. The neck 18 has an open mouth 20 in fluid communication with the interior volume 16. The neck 18 includes structure to allow for removable fastening of other portion of the bottle arrangement 10. In this embodiment, the neck 18 includes threads 22 along the outer surface 24 of the neck 18.

Figure 5:
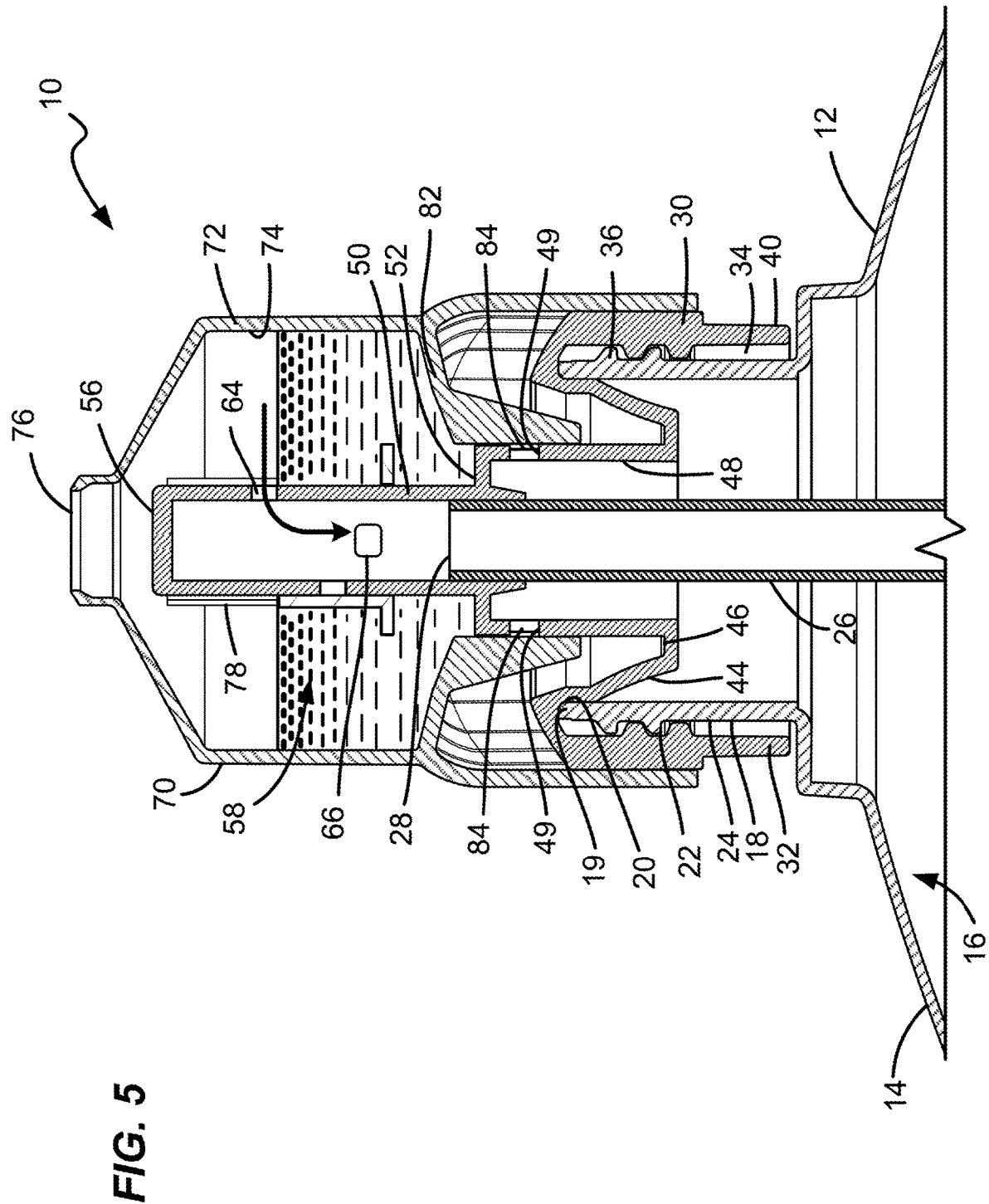
FIG. 5 is a schematic cross-sectional view of the dosing bottle arrangement of FIG. 4 and showing liquid within the dosing volume.

Still in reference to FIG. 5, the dosing bottle arrangement 10 further includes a dip tube, or riser 26. The riser 26 is an open tube which extends from the interior volume 16 of the container 12 and through the open mouth 20 of the neck 18. The riser 26 will convey liquid from the interior volume 16 through the interior of the riser 26 through the neck 18 and out through an open end 28 to other portions of the dosing bottle arrangement 10.

The dosing bottle arrangement 10 further includes a cap piece 30. The cap piece 30 has an outer surrounding wall 32. The outer surrounding wall 32 is removably attached to the neck 18. While many different possibilities exist, in the example shown, an inner surface 34 of the outer surrounding wall 32 includes threads 36, which mate with the threads 22 on the neck 18. This allows for easy and convenient removal of the cap piece 30 from the container 12.

The outer surrounding wall 32 further includes a plurality of axially extending tracks 38, in the form of indentations that extend along an outer surface 40 of the outer surrounding wall 32.

The cap piece 30 further includes a gusset arrangement 44 (FIG. 5). The gusset arrangement 44 radially extends from the outer surrounding wall 32 and within the open mouth 20 of the neck 18. As can be seen in FIG. 5, the cap piece 30 is folded over an end rim 19 of the neck 18, to join the outer surrounding wall 32 with the gusset arrangement 44. The gusset arrangement 44 forms an internal V-shape having an open recess at 46 within the mouth 20 of the neck 18. A most radially interior part of the V-section of the gusset arrangement 44 forms an interior cylinder 48 which circumscribes and surrounds the riser 26.

The cap piece 30 further includes a standpipe 50 extending from the gusset arrangement 44. In the example shown, the standpipe 50 extends from an interior aperture 52 of the interior cylinder 48. The standpipe 50 includes a tubular wall 54 connected to the riser 26. In particular, the tubular wall 54 is connected to the riser 26 at the open end 28 of the riser 26.

The tubular wall 54 of the standpipe 50 has a closed end 56 opposite of the end which connects to the riser 26. Along the body of the tubular wall 54 is one or more return openings 58. The return openings 58 allow for liquid which is conveyed from the interior volume 16 of the container 12, through the riser 26 to flow through the tubular wall 54 of the standpipe 50 and then flow through the return opening 58 to a remaining portion of the bottle arrangement 10. The return opening 58 has an associated predetermined liquid dosing amount associated with it.

It should be understood that there can be several return openings 58, each return opening being associated with a predetermined liquid dosing amount. In this example, there are four return openings 58. These include a first return opening 60, a second return opening 62, third return opening 64, and fourth return opening 66. Each of the return openings 60, 62, 64, 66 is both radially spaced and axially spaced from each of the other return openings 60, 62, 64, 66. The axial spacing between them allows for each return opening 60, 62, 64, 66 is correlated with a predetermined liquid dosing amount. The radial spacing between each of the return openings 60, 62, 64, 66 allows for a radial selection of which predetermined liquid dosing amount is desired.

The interior cylinder 48 of the cap piece 30 includes a plurality of circumferentially arranged detents 49, being radially aligned with the return openings 58. The detents 49 will receive projections from a closure member 70, as further described.

The bottle arrangement 10 further includes closure member 70. The closure member 70 has a surrounding enclosure 72 rotatably attached to the cap piece 30 and defining an interior dosing volume 74 there within. At an upper portion of the closure member 70 is a dispenser opening 76. When the bottle arrangement 10 is an open position, the dispenser opening 76 is in open fluid communication with the interior dosing volume 74, to allow for liquid within the interior dosing volume 74 to flow through the dispenser opening 76. FIG. 1 shows the bottle arrangement 10 when in a closed position. In a closed position, the standpipe 50 is blocking or plugging the dispenser opening 76.

The closure member 70 is preferably made from a transparent material to allow for visual inspection of the interior dosing volume 74.

The closure member 70 includes visual markings 42 on the surrounding enclosure 72 of the closure member 70. The visual markings 42 can show a number, representing the number of fluid ounces or milliliters that will be dosed (allowed to flow into the interior dosing volume 74), when the bottle arrangement 10 is used.

The outer surrounding wall 32 of the cap piece 30 includes a visual indicator in the form of a geometric figure, such as a triangle, or an arrow 43, such that the closure member 70 can be rotated to match the visual marking 42 on the closure member with the arrow 43 to select the desired dosing amount.

The closure member 70 further includes a tube 78. The tube 78 is secured to the surrounding enclosure 72 within the interior dosing volume 74 via a connection piece 82. The connection piece 82 is received within the recess 46. The tube 78 is positioned to be in covering relation to the tubular wall 54 of the standpipe 50. The tube 78 includes an aperture 80 (FIG. 2). The aperture 80 can be aligned with one of the return openings 58 to allow for liquid to flow from the interior volume 16 of the container 12, through the riser 26, through one of the return openings 60, 62, 64, 66, and through the aperture 80 into the interior dosing volume 74.

The connection piece 82 includes projections 84, which are received by the detents 49. An axial position of the projections 84/detents 49 are correlated to the height level/axial position of the closure member 70 relative to the cap piece 30 so that the correction return opening 60, 62, 64, 66 is exposed, corresponding to the selected number of fluid ounces or milliliters to fill the dosing volume 74.

Figure 4:
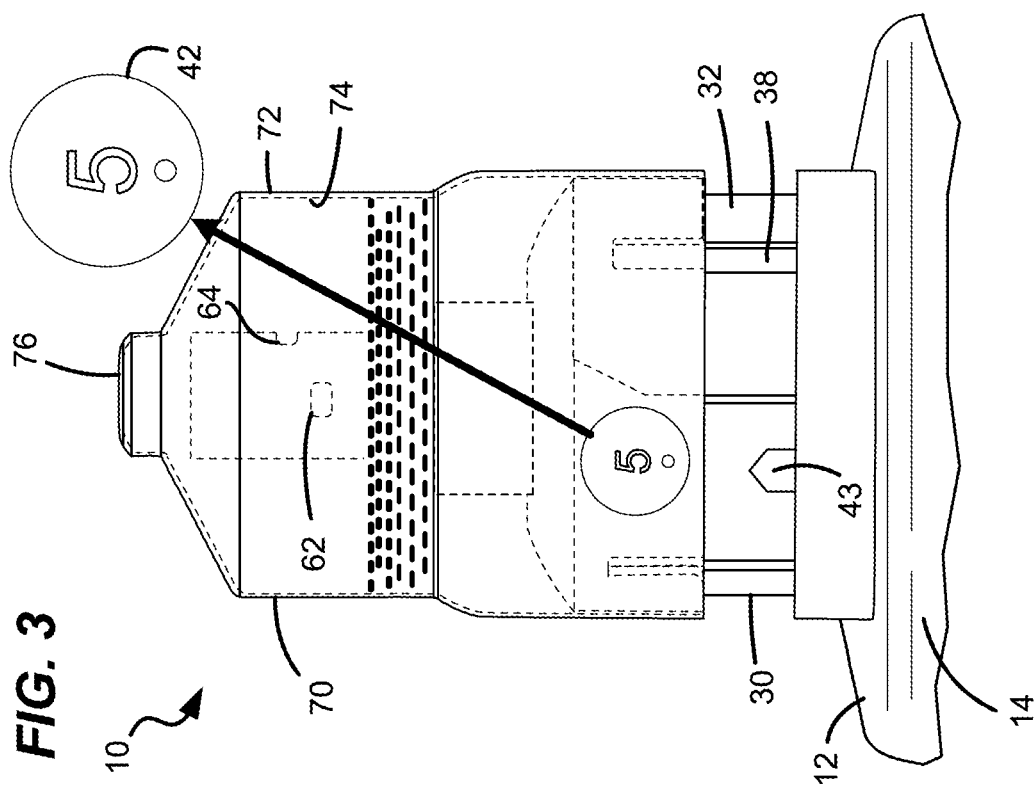
FIG. 4 is the dosing bottle arrangement of FIGS. 1-3, and showing a different selected desired liquid amount for the interior dosing volume.

In general, the closure member 70 is axially movable relative to the cap piece 30 between a closed position (FIGS. 1 and 2) and an open position (FIGS. 3-5). The closed position being the position in which the tube 78 covers all of the return openings 60, 62, 64, 66 in the tubular wall 54. The open position is the position in which the aperture 80 in the tube 78 is in open communication with a selected one of the return openings 58, such that liquid in the interior volume 16 of the container 12 can flow through the riser 26 and through the selected return opening 58 and into the interior dosing volume 74.

The surrounding enclosure 72 is rotatable relative to the cap piece 30 to a selected desired liquid amount for the interior dosing volume 74. The relative rotational position of the surrounding enclosure 72 and the cap piece 30 places the tube aperture 80 in radial alignment with one of the return openings, 60, 62, 64, 66.

The above bottle arrangement 10 can be used in as part of a method of providing a measured dose of a liquid. The method includes selecting a desired liquid dosing amount by rotating the closure member 70 relative to cap piece 30 and radially align an aperture 80 in a tube 78 of the closure member 70 with a return opening 60-66 in tubular wall 54 of standpipe 50 of the cap piece 30.

The method further includes axially moving the closure member 70 relative to the cap piece 30 from a closed position to an open position to put the aperture 80 in open communication with the return opening 60-66.

The method can further include squeezing container 12 having riser 26 to move liquid in the interior volume 16 of the container 12 through the riser 26 and through the return opening 60-66 and into the interior dosing volume 74 of the closure member 70.

The step of squeezing the container 12 includes squeezing the container wall 14 surrounding the interior volume 16 of the container 12; the container 12 has protruding neck 18; and the neck 18 having open mouth 20 in communication with the interior volume 16; the riser 26 extends from the interior volume 16 and through the open mouth 20 of the neck 18.

The step of selecting a desired liquid dosing amount includes using the cap piece 30; the cap piece 30 having outer surrounding wall 32 removably attached to the neck 18; gusset arrangement 44 radially extending from the outer surrounding wall 32 and within the open mouth 20 of the neck 18; and the standpipe 50 extending from the gusset arrangement 44; the standpipe 50 including the tubular wall 54 connected to the riser 26 at one end, an opposite closed end 56, and one or more return openings 60-66 in the tubular wall 54.

The step of selecting a desired liquid dosing amount includes rotating the closure member 70, the closure member having: a surrounding enclosure 72 rotatably attached to the cap piece 30 and defining an interior dosing volume 74 and a dispenser opening 76; the tube 78 being secured to the enclosure 72 within the interior dosing volume; wherein the closure member 70 is axially movable relative to the cap piece 30 between the closed position and the open position; the closed position including the tube 78 covering all of the return openings 60-66 in the tubular wall 54; and the open position including the aperture 80 in the tube 78 being in open communication with one or more of the return openings 60-66, such that a liquid in the interior volume 16 of the container 12 can flow through the riser 26 and through the return opening 60-66 and into the interior dosing volume 74.

The step of rotating the closure member 70 includes moving the surrounding enclosure 72 relative to the cap piece 30 and placing the tube aperture 80 in radial alignment with one of the return openings 60-66.

The method includes the outer surrounding wall 32 of the closure member 70 includes visual markings 42 indicative of a predetermined liquid dosing amount associated with each of the return openings 60-66; and the step of selecting a desired liquid dosing amount includes rotating the closure member 70 relative to the cap piece 30 to align a marking 42 on the closure member 70 with the visual marking 43 on the cap piece 30.

The above represents example principles. Many embodiments can be made using these principles.

What is claimed is:
1. A dosing bottle arrangement comprising:
 (a) a container having a container wall surrounding an interior volume and a protruding neck; the neck having an open mouth in communication with the interior volume;

(b) a riser extending from the interior volume of the container and through the open mouth of the neck;
(c) a cap piece having:
  (i) an outer surrounding wall removably attached to the neck;
  (ii) a gusset arrangement radially extending from the outer surrounding wall and within the open mouth of the neck; and
  (iii) a standpipe extending from the gusset arrangement; the standpipe including a tubular wall connected to the riser at one end, an opposite closed end, and one or more return openings in the tubular wall; and
(d) a closure member having:
  (i) a surrounding enclosure rotatably attached to the cap piece and defining an interior dosing volume and a dispenser opening;
  (ii) a tube secured to the enclosure within the interior dosing volume; the tube being in covering relation to the standpipe; the tube having an aperture;
  wherein the closure member is axially movable relative to the cap piece between a closed position and an open position;
  (A) the closed position including the tube covering all of the return openings in the tubular wall; and
  (B) the open position including the aperture in the tube being in open communication with one or more of the return openings, such that a liquid in the interior volume of the container can flow through the riser and through the return opening and into the interior dosing volume.

2. The dosing bottle arrangement of claim 1 wherein the one or more return openings includes at least a first opening and a second opening radially and axially spaced from each other; the first opening and second opening each having a predetermined liquid dosing amount associated therewith.

3. The dosing bottle arrangement of claim 2 wherein the surrounding enclosure is rotatable relative to the cap piece to select a desired liquid amount for the interior dosing volume; the relative rotational position of the surrounding enclosure and the cap piece placing the tube aperture in radial alignment with one of the first opening or the second opening.

4. The dosing bottle arrangement of claim 3 wherein the one or more return openings further includes a third opening and a fourth opening radially and axially spaced from each other and from the first opening and second opening; the third opening and fourth opening each having a predetermined liquid dosing amount associated therewith.

5. The dosing bottle arrangement of claim 4 wherein the surrounding enclosure is rotatable relative to the cap piece to select a desired liquid amount for the interior dosing volume; the relative rotational position of the surrounding enclosure and the cap piece placing the tube aperture in radial alignment with one of the first opening, the second opening, the third opening, or the fourth opening.

6. The dosing bottle arrangement of claim 5 wherein the outer surrounding wall of the closure member includes visual markings indicative of a predetermined liquid dosing amount associated with each of the return openings.

7. The dosing bottle arrangement of claim 6 wherein the closure member is transparent to allow visual inspection of the interior dosing volume.

8. The dosing bottle arrangement of claim 1 wherein the container comprises an elastically deformable material, such that the container can be squeezed when the cap piece is in the open position to move liquid in the interior volume of the container through the riser and through the return opening and into the interior dosing volume.

9. The dosing bottle arrangement of claim 1, wherein the gusset arrangement forms an internal V-shape having an open recess within the open mouth of the neck, wherein a most radially interior part of the V-shape forms an interior cylinder which circumscribes and surrounds the riser.

10. A method of using a dosing bottle arrangement; the method comprising:
(a) selecting a desired liquid dosing amount by rotating a closure member relative to a cap piece and radially align an aperture in a tube of the closure member with a return opening in a tubular wall of a standpipe of the cap piece;
(b) axially moving the closure member relative to the cap piece from a closed position to an open position to put the aperture in open communication with the return opening; and
(c) squeezing a container having a riser to move liquid in an interior volume of the container through the riser and through the return opening and into an interior dosing volume of the closure member.

11. The method of claim 10 wherein the step of squeezing a container having a riser includes squeezing a container wall surrounding the interior volume of the container; the container having a protruding neck; and the neck having an open mouth in communication with the interior volume; the riser extending from the interior volume of the container and through the open mouth of the neck.

12. The method of claim 11 wherein the step of selecting a desired liquid dosing amount includes using the cap piece; the cap piece having:
(a) an outer surrounding wall removably attached to the neck;
(b) a gusset arrangement radially extending from the outer surrounding wall and within the open mouth of the neck; and
(c) the standpipe extending from the gusset arrangement; the standpipe including the tubular wall connected to the riser at one end, an opposite closed end, and one or more return openings in the tubular wall.

13. The method of claim 12 wherein the step of selecting a desired liquid dosing amount includes rotating the closure member, the closure member having:
(a) a surrounding enclosure rotatably attached to the cap piece and defining an interior dosing volume and a dispenser opening;
(b) the tube being secured to the enclosure within the interior dosing volume; wherein the closure member is axially movable relative to the cap piece between the closed position and the open position;
  (i) the closed position including the tube covering all of the return openings in the tubular wall; and
  (ii) the open position including the aperture in the tube being in open communication with one or more of the return openings, such that a liquid in the interior volume of the container can flow through the riser and through the return opening and into the interior dosing volume.

14. The method of claim 13 wherein the step of rotating the closure member includes moving the surrounding enclosure relative to the cap piece and placing the tube aperture in radial alignment with one of the return openings.

15. The method of claim 13 wherein:
(a) the outer surrounding wall of the closure member includes visual markings indicative of a predetermined liquid dosing amount associated with each of the return openings; and
(b) the step of selecting a desired liquid dosing amount includes rotating the closure member relative to the cap piece to align a marking on the closure member with one of the visual markings on the cap piece.

16. The method of claim 11, further including a step of releasing the container to cause excess liquid to return through the riser to the interior volume.

\* \* \* \* \*